A. P. LUNDIN & H. W. BROADY.
DAVIT FOR LOWERING AND RAISING SHIPS' BOATS.
APPLICATION FILED AUG. 1, 1912.
1,105,594.
Patented July 28, 1914
4 SHEETS—SHEET 1
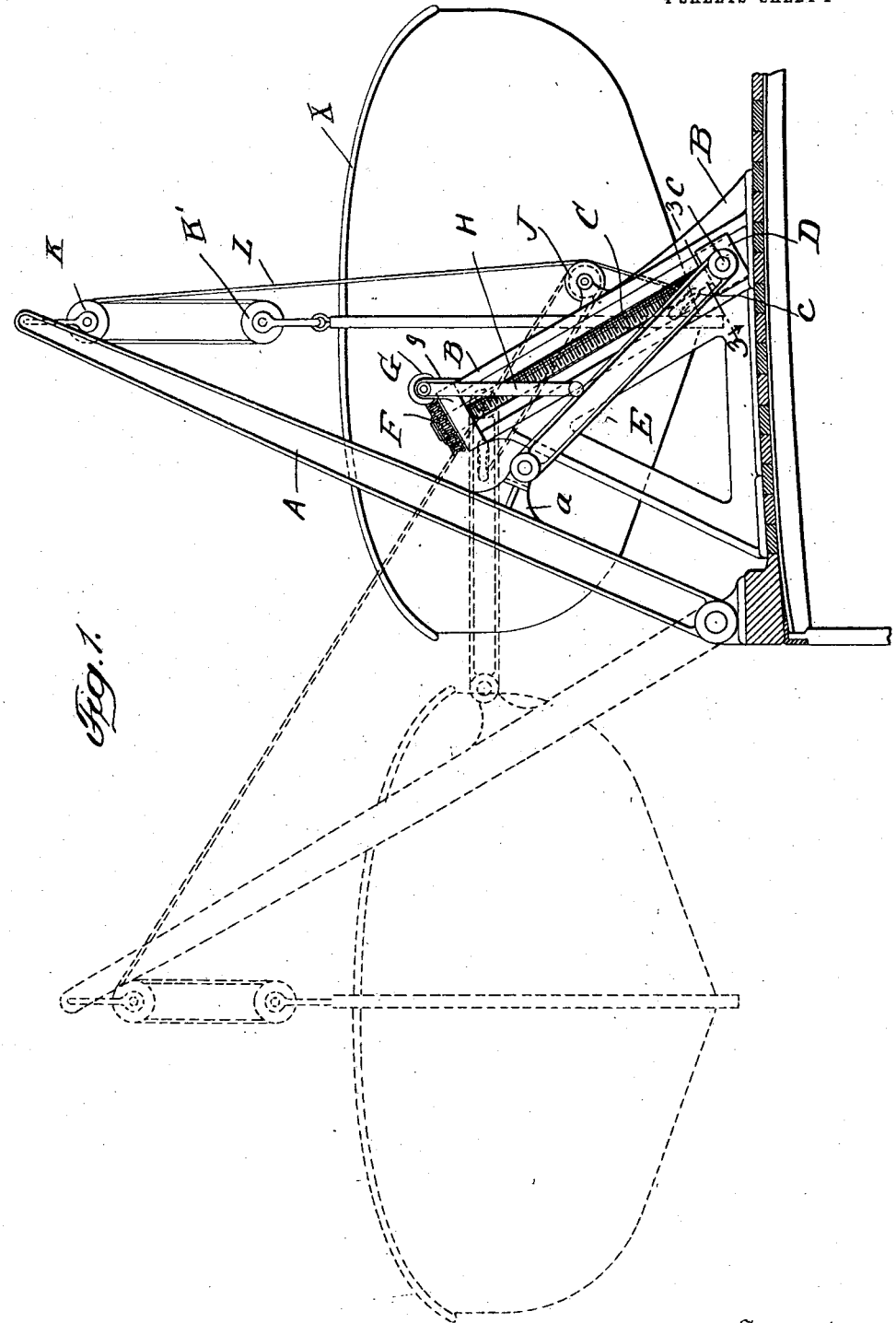

A. P. LUNDIN & H. W. BROADY.
DAVIT FOR LOWERING AND RAISING SHIPS' BOATS
APPLICATION FILED AUG. 1, 1912.
1,105,594.
Patented July 28, 1914.
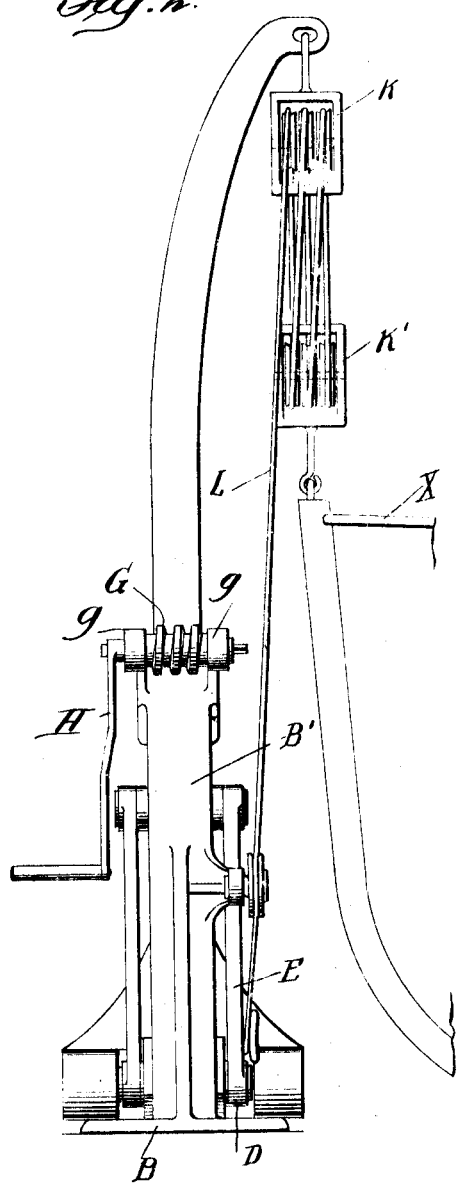
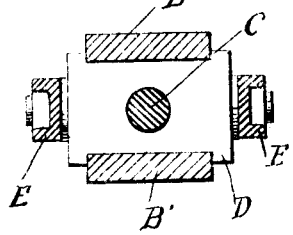

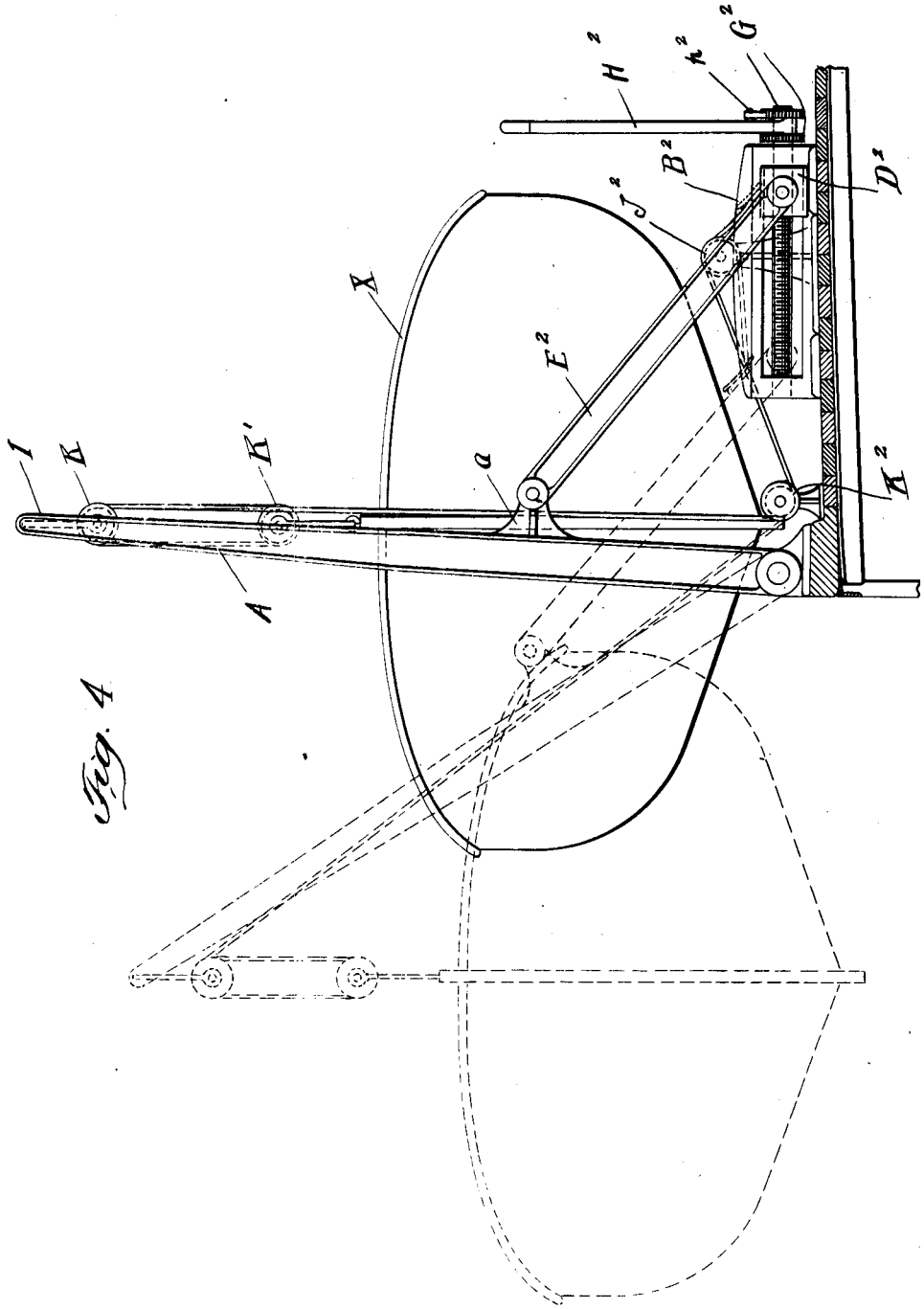

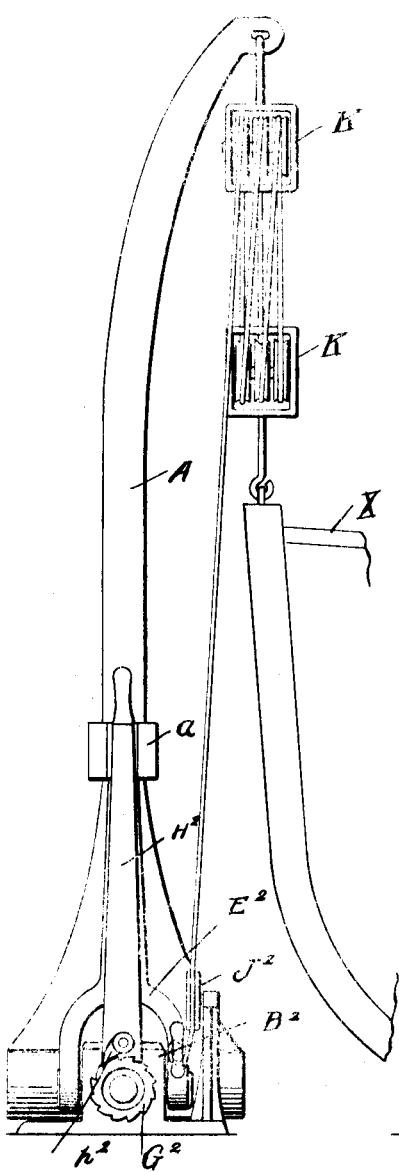
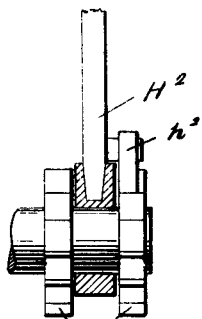
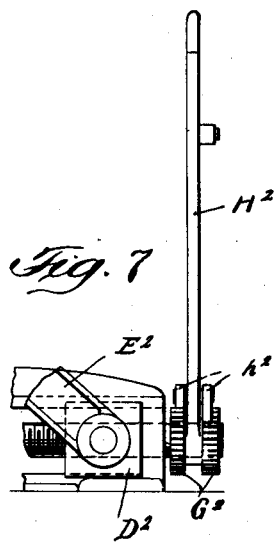
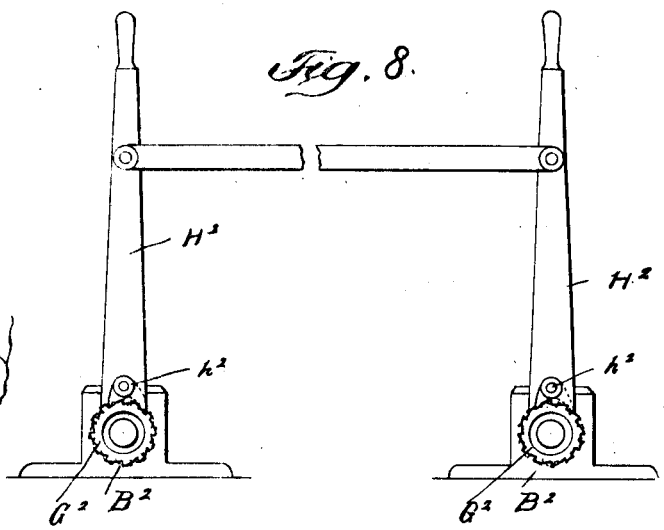

UNITED STATES PATENT OFFICE.

ANDREAS P. LUNDIN AND HARRY W. BROADY, OF BAYSIDE, NEW YORK; SAID BROADY ASSIGNOR TO SAID LUNDIN.

DAVIT FOR LOWERING AND RAISING SHIPS' BOATS.

1,105,594.      Specification of Letters Patent.      Patented July 28, 1914.

Application filed August 1, 1912. Serial No. 712,640.

*To all whom it may concern:*

Be it known that we, ANDREAS P. LUNDIN and HARRY W. BROADY, citizens of the United States, and residents of Bayside, county of Queens, and State of New York, have invented certain new and useful Improvements in Davits for Lowering and Raising Ships' Boats, of which the following is a specification.

Our invention relates to improvements in davits for ships' boats and similar purposes.

By the use of our invention we provide an extremely simple, safe and inexpensive device for launching and swinging inboard ships' boats or other loads.

In the preferred embodiment of our invention we provide, in combination with a davit pivoted at its lower extremity, a link pivoted at one end to the davit intermediate the ends thereof and at its other end pivoted to a traveling nut threaded on a screw supported in an inclined position on the deck of the vessel so as to have rotary but not longitudinal movement and means for rotating the screw to compel the nut to travel along the same, thus forcing the link and with it the davit arm to move outwardly or inwardly according to the direction of rotation. Such a construction permits a longer power or actuating screw to be employed, saves valuable deck space and permits the more direct application of power. We furthermore preferably so arrange the falls that the weight of the boat will have a balancing effect and assist the operator in the actuation of the screw in that it relieves thrust on the screw and pulls on the link upwardly or outwardly until the davit arm reaches a point slightly beyond its perpendicular position, from which point onward, the weight of the boat will pull on the link and tend to retard the movement of the nut on the screw.

In the accompanying drawings which illustrate a preferred embodiment of our invention and in which similar reference characters designate corresponding parts throughout the several views; Figure 1 is a side elevation of a davit embodying our invention; Fig. 2 is an end elevation of the same; Fig. 3 is a section on the line 3—3 of Fig. 1; Figs. 4 and 5 are side and end elevations respectively of another modified form of davit operating mechanism embodying our invention; Fig. 6 is a detail of the ratchet and pawl mechanism shown in Figs. 4 and 5; and Figs. 7 and 8 are modifications showing the application of the actuating mechanism to the simultaneous operation of two davits.

Referring now to Figs. 1, 2 and 3 of these drawings, A indicates a davit arm pivoted at its lower extremity and provided at its upper end with suitable means for attaching the falls of a boat.

B designates a triangular frame secured to the deck in any suitable manner and C indicates a screw supported in an inclined position in said frame to have rotary but not longitudinal movement. Threaded on the screw C is a nut D provided with trunnions c extending outwardly on each side thereof. A link E, bifurcated at its lower end is pivoted at that end on the trunnions c and its upper end is pivoted to the bracket a intermediate the ends of the davit arm A. Obviously when the screw is rotated, the nut will be compelled to travel along the same and the link E will push or pull the davit arm outwardly or inwardly according to the direction of rotation.

Suitable means for rotating the screw is provided. As illustrated in Figs. 1 and 2 we have shown a worm wheel F fixed on the upper end of the screw C and a worm G supported in brackets g meshing with a worm wheel F and rotated by a crank H. It will be seen that by supporting the screw in an inclined position as illustrated in Figs. 1 and 2 a longer actuating screw may be employed, the power of the screw may be very effectively applied to the davit through the link, and furthermore such inclination of the screw results in the saving of valuable deck space.

In order to take advantage most effectively of the balancing or compensating effect of the weight of the load, which in Figs. 1 and 2 is a boat X, we preferably journal a pulley J on the bearing casing B' intermediate the ends of the screw and a suspension rope L running through the suspension pulleys K and K' is then led around the pulley J and has its other end connected to a cleat e on the lower end of the link E.

As illustrated in Figs. 1 and 2, we provide two suspension blocks having a plurality of pulleys running on parallel axes and consequently a plurality of "parts" of rope, though of course, a single pulley at the top of davit would answer the purpose. It will be seen that when the weight of the boat rests upon the falls, the rope L will be drawn over the pulley J and will pull upwardly on the link E and nut D and this pull will continue until the nut travels a sufficient distance along the screw to move the davit to a substantially perpendicular position, whereupon the pull on said rope will be changed to a downward or retarding pull, thus assisting the screw in its negative or retaining action as the weight of the davit exerts a pull on the link. This balancing effect of the weight of the load therefore acts in two directions during the swinging or oscillating of the davit in one direction. Of course, in swinging the boat or load inboard, the operation will be exactly the reverse of that above described.

In Figs. 4 to 8 inclusive we have shown a modified form of davit swinging mechanism embodying our balancing or compensating arrangement of the ropes and pulleys and said figures also show the application of the davit-swinging mechanism to two davits. In said figures, $B^2$ indicates a horizontally-disposed frame in which is mounted a screw $C^2$, having a nut $D^2$ threaded thereon. $E^2$ designates a link pivotally connected at one end to the nut $D^2$ and at the other end to the bracket $a$ of the davit A. A pulley $J^2$ is mounted on the frame $B^2$ and the rope passes over the same and is connected in a manner similar to that hereinabove described.

To actuate two davits simultaneously, we preferably extend the end of the screw $C^2$ and fix thereon two ratchet wheels $G^2$ which coöperate with two pawls $h^2$ to permit the screw to be rotated in opposite directions, one or both of the connected hand levers $H^2$ being reciprocated for this purpose. One pawl $h^2$ is, of course, thrown out of engagement while the other is in engagement. In other respects the device is identical with that shown in Figs. 1 and 2.

Having described our invention, we claim:

1. The combination with a davit arm pivoted at its lower end to swing freely in a vertical plane to both sides of a perpendicular position, of a frame secured to the deck of a vessel, a screw supported in said frame in an inclined position to have rotary movement only, a nut threaded on the screw, a link connecting said nut and davit arm and means for rotating the screw.

2. The combination with a davit arm pivoted at its lower end to swing freely in a vertical plane to both sides of a perpendicular position, of a frame secured to the deck of a vessel, a screw supported in said frame to have rotary movement only, a nut threaded on the screw, a link connecting a point on the davit arm intermediate its ends with the said nut, and a flexible connection between the load and a moving part of the mechanism for exerting a balancing pull on the davit in two directions during the movement of said davit in one direction.

3. The combination with a davit arm pivoted at its lower end to swing freely in a vertical plane to both sides of a perpendicular position, of a frame secured to the deck of a vessel, a screw supported in said frame to have rotary movement only, a nut threaded on the screw, a link connecting a point on the davit arm intermediate its ends with the said nut, a pulley mounted on said frame intermediate the ends of said screw and a rope extending from the load over a pulley at the top of the davit, thence led over said pulley on the frame and connected to a traveling part of the mechanism.

In witness whereof, we have signed our names to the foregoing specification in the presence of two subscribing witnesses.

ANDREAS P. LUNDIN.
HARRY W. BROADY.

Witnesses:
FREDERICK P. RANDOLPH,
HELEN V. HOLMES.